(12) United States Patent
Williams

(10) Patent No.: US 11,377,151 B2
(45) Date of Patent: Jul. 5, 2022

(54) STANDARD ACCESSORY MOUNTING POINTS FOR TRUCKS AND SUVS

(71) Applicant: Toyota Motor Engineering & Manufacturing North America, Inc., Plano, TX (US)

(72) Inventor: Colby Steven Williams, Milan, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 230 days.

(21) Appl. No.: 16/700,862

(22) Filed: Dec. 2, 2019

(65) Prior Publication Data
US 2021/0163069 A1   Jun. 3, 2021

(51) Int. Cl.
*B60R 3/00* (2006.01)
*B60R 19/52* (2006.01)
*B62D 21/15* (2006.01)

(52) U.S. Cl.
CPC .............. *B62D 21/15* (2013.01); *B60R 3/002* (2013.01); *B60R 19/52* (2013.01)

(58) Field of Classification Search
CPC  B60R 3/00; B60R 3/002; B60R 3/007; B60R 9/002; B60R 9/06; B60R 19/24; B60R 19/44; B60R 19/48; B60R 19/52; B60R 2019/245; B60R 2019/522; B60R 2019/525; B60R 2019/527; B62D 21/02; B62D 21/05
USPC ............... 224/484, 492, 511, 512, 513, 518; 296/14.07, 37.6, 43, 204
See application file for complete search history.

(56) References Cited

U.S. PATENT DOCUMENTS

| 4,950,010 A | * | 8/1990 | Denny | ..................... B60D 1/54 280/460.1 |
| 5,224,636 A | * | 7/1993 | Bounds | ..................... B60R 9/06 224/281 |
| 5,244,178 A | | 9/1993 | Stewart | |

(Continued)

FOREIGN PATENT DOCUMENTS

EP         2946972 B1      7/2019

OTHER PUBLICATIONS

2017 Ford F-150 Raptor picture (Year: 2017).*
2017 Ford F-150 Raptor window sticker (Year: 2017).*

*Primary Examiner* — Gregory A Blankenship
(74) *Attorney, Agent, or Firm* — Snell & Wilmer LLP

(57) ABSTRACT

Methods and systems for attaching accessories to a vehicle. The system includes a first plurality of attachment devices located on a frame rail of a first vehicle, the first plurality of attachment devices spaced apart by a distance. The system also includes a second plurality of attachment devices located on a frame rail of a second vehicle, the second plurality of attachment devices spaced apart by the distance. The system also includes a plurality of engagement members of a vehicle accessory, each engagement member of the plurality of engagement members spaced apart by the distance and configured to engage with respective attachment devices from the first plurality of attachment devices or the second plurality of attachment devices. The system also includes a plurality of connectors configured to secure the plurality of engagement members to the first plurality of attachment devices or the second plurality of attachment devices.

20 Claims, 6 Drawing Sheets

(56) References Cited

U.S. PATENT DOCUMENTS

| | | | | |
|---|---|---|---|---|
| 5,699,985 A * | 12/1997 | Vogel | | B60R 9/06 224/564 |
| 5,992,926 A * | 11/1999 | Christofaro | | B62D 21/02 296/204 |
| 6,095,387 A * | 8/2000 | Lipscomb | | B60R 9/06 224/485 |
| 6,450,379 B1 * | 9/2002 | Cook | | B60R 9/02 211/41.14 |
| 6,840,554 B2 * | 1/2005 | Ferrigan | | B60D 1/075 224/512 |
| 7,090,267 B2 | 8/2006 | Pendarvis | | |
| 7,407,206 B2 | 8/2008 | Arns et al. | | |
| 7,914,046 B2 | 3/2011 | Iverson | | |
| 8,366,170 B2 * | 2/2013 | Glickman | | B60R 13/0861 296/39.3 |
| 8,864,158 B1 * | 10/2014 | Perkins | | B60R 3/002 280/163 |
| 9,120,429 B2 * | 9/2015 | Lungershausen | | B60R 9/06 |
| 9,452,713 B2 | 9/2016 | Stickles | | |
| 9,677,701 B2 | 6/2017 | Goodrich | | |
| 9,845,123 B2 | 12/2017 | Byrnes et al. | | |
| 9,963,078 B1 | 5/2018 | Zimmermann et al. | | |
| 10,005,403 B2 | 6/2018 | Calvin | | |
| 10,035,408 B2 | 7/2018 | Crismon et al. | | |
| 10,220,889 B2 | 3/2019 | Smith et al. | | |
| 2002/0079667 A1 * | 6/2002 | Pohill | | B60R 3/002 280/163 |
| 2003/0010800 A1 * | 1/2003 | McCoy | | B60D 1/58 224/510 |
| 2006/0186681 A1 | 8/2006 | Elwell | | |
| 2006/0201980 A1 * | 9/2006 | Koons | | B60D 1/485 224/511 |
| 2007/0090142 A1 * | 4/2007 | Chuang | | B60P 3/07 224/496 |
| 2008/0169667 A1 | 7/2008 | Siniarski et al. | | |
| 2009/0189381 A1 * | 7/2009 | Kirtland | | B60R 9/06 280/769 |
| 2009/0294497 A1 * | 12/2009 | Todorovic | | B60R 9/02 224/402 |
| 2010/0102579 A1 * | 4/2010 | Hardy | | B60R 19/48 293/106 |
| 2011/0006553 A1 * | 1/2011 | Fretz | | B60R 19/48 293/115 |
| 2012/0091682 A1 * | 4/2012 | Kowalski | | B60R 3/002 280/163 |
| 2014/0138941 A1 * | 5/2014 | Lin | | B62D 27/023 280/785 |
| 2014/0166713 A1 * | 6/2014 | Kirtland | | B60R 19/48 224/521 |
| 2015/0091270 A1 * | 4/2015 | Stanesic | | H04N 19/436 280/163 |
| 2016/0059810 A1 * | 3/2016 | Watanabe | | B62D 21/152 293/133 |
| 2017/0057425 A1 | 3/2017 | Pulleyblank et al. | | |
| 2018/0079300 A1 * | 3/2018 | Compton | | B60K 5/02 |
| 2019/0126868 A1 * | 5/2019 | Wymore | | B60R 19/44 |
| 2019/0337476 A1 * | 11/2019 | Hare | | B60R 19/48 |
| 2020/0238936 A1 * | 7/2020 | Schumacher | | B60R 19/50 |
| 2021/0024131 A1 * | 1/2021 | Baccouche | | B60K 1/04 |
| 2021/0163069 A1 * | 6/2021 | Williams | | B62D 21/15 |

* cited by examiner

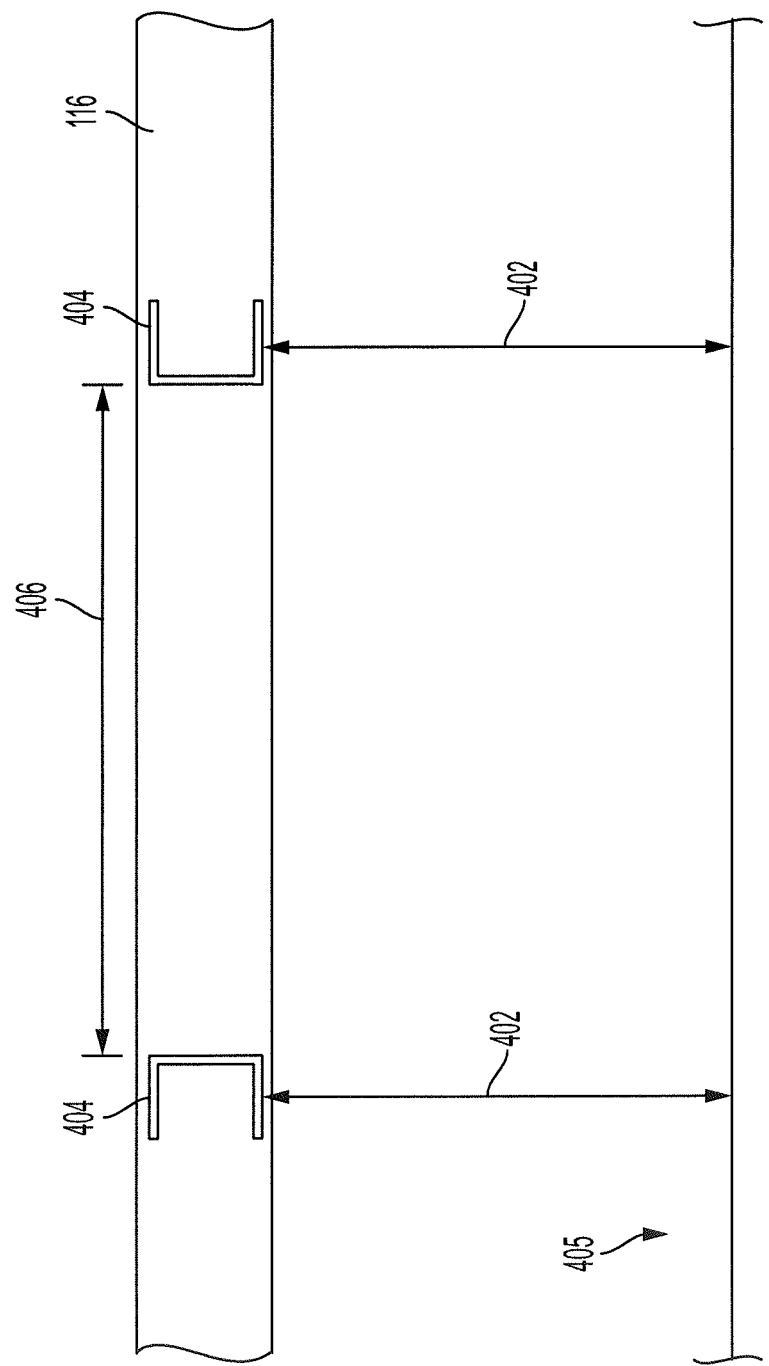

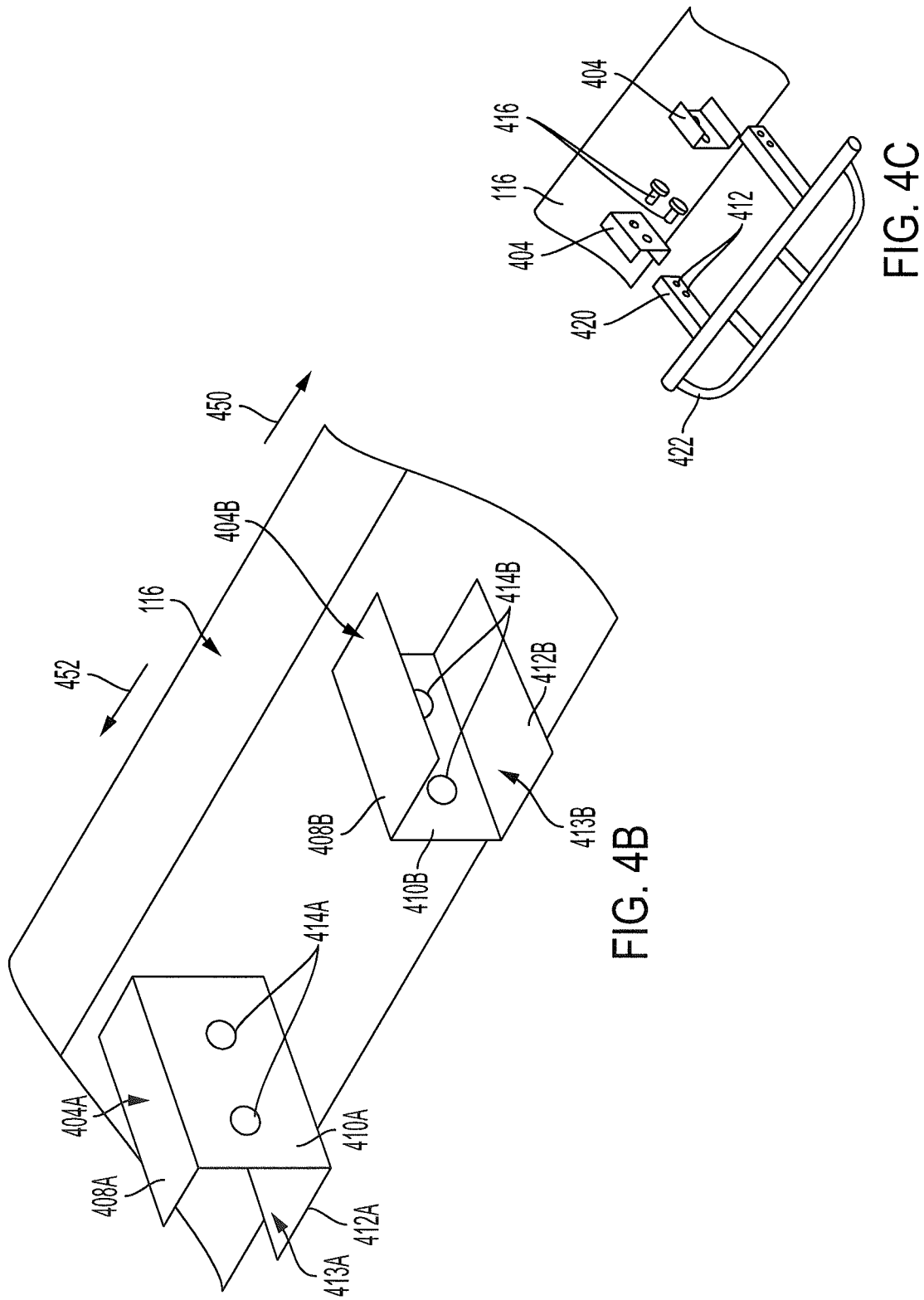

ns of the invention.
STANDARD ACCESSORY MOUNTING POINTS FOR TRUCKS AND SUVS

BACKGROUND

1. Field

This specification relates to a system and a method for providing standardized accessory mounting points to be attached to vehicles, such as trucks or sport utility vehicles (SUVs).

2. Description of the Related Art

Some owners of vehicles attach accessories to their vehicles. For example, a brush guard or grill guard may be attached to the front of a truck or SUV. In another example, running boards may be attached to the sides of a truck or SUV. These accessories attach directly to the frame of the vehicle. Some vehicles have mounting points on the frame of the vehicle for attaching accessories to. Other vehicles have no mounting points, and require drilling into the frame or welding mounting points onto the frame. In some situations, the accessories are permanently attached to the frame of the vehicle. In these conventional systems, the accessories often cannot be removed from the frame on which they are initially mounted, for later reuse. Even if the accessories are capable of being removed for later reuse, there is almost no certainty that the removed accessory will fit onto the mounting points of the next vehicle. As a result, many different variants of a single accessory of varying sizes and dimensions are manufactured, to cover all of the various makes and models of available vehicles. This is not cost efficient for the consumer, nor for the manufacturers of accessories. Thus, there is a need for improved accessory systems.

SUMMARY

What is described is a vehicle accessory system. The system includes a first plurality of attachment devices located on a frame rail of a first vehicle, the first plurality of attachment devices spaced apart by a distance. The system also includes a second plurality of attachment devices located on a frame rail of a second vehicle, the second plurality of attachment devices spaced apart by the distance. The system also includes a plurality of engagement members of a vehicle accessory, each engagement member of the plurality of engagement members spaced apart by the distance and configured to engage with respective attachment devices from the first plurality of attachment devices or the second plurality of attachment devices. The system also includes a plurality of connectors configured to secure the plurality of engagement members to the first plurality of attachment devices or the second plurality of attachment devices.

Also described is a vehicle having a frame rail and a first plurality of attachment devices located on the frame rail. The first plurality of attachment devices are spaced apart by a distance and configured to engage with respective engagement members of a plurality of engagement members of a vehicle accessory. The plurality of engagement members are spaced apart by the distance, and the attachment devices are secured to the engagement members via a plurality of connectors.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIG. 4A illustrates a side view of a frame rail with accessory mounting points, according to various embodiments of the invention.

FIG. 4B illustrates a perspective view of a frame rail with accessory mounting points, according to various embodiments of the invention.

FIG. 4C illustrates a perspective view of a frame rail with accessory mounting points and an accessory, according to various embodiments of the invention.

DETAILED DESCRIPTION

Disclosed herein are systems, vehicles, and methods for attaching an accessory to a vehicle. The systems and methods described herein include standardized mounting points on a frame of a vehicle. The standardized mounting points are common across multiple vehicles. This standardization of mounting points across multiple vehicles allows accessories to be easily attached to a first vehicle, removed from the first vehicle, and attached to a second vehicle. The standardization of mounting points includes both standardization of location of the mounting points on the vehicle, as well as the mounting hardware used to attach the accessory to the vehicle.

By standardizing mounting points across multiple vehicles, manufacturing costs may be reduced for the manufacturer of the accessories. For example, instead of manufacturing a grill guard for Make A, Models X, Y, and Z, and a grill guard for Make B, Models U, V, and W, the manufacturer may instead manufacture a grill guard for full-size trucks/SUVs and a grill guard for compact trucks/SUVs.

In addition, when accessory mounting points are included by the vehicle manufacturer, the stability and strength of the vehicle may be improved, as the vehicle manufacturer is most knowledgeable about the properties of the vehicle and may reinforce the mounting points, if necessary. Conventional systems of attaching vehicle accessories to a vehicle frame may not take vehicle properties into sufficient account, and may result in a weakened vehicle.

Figure 1A:
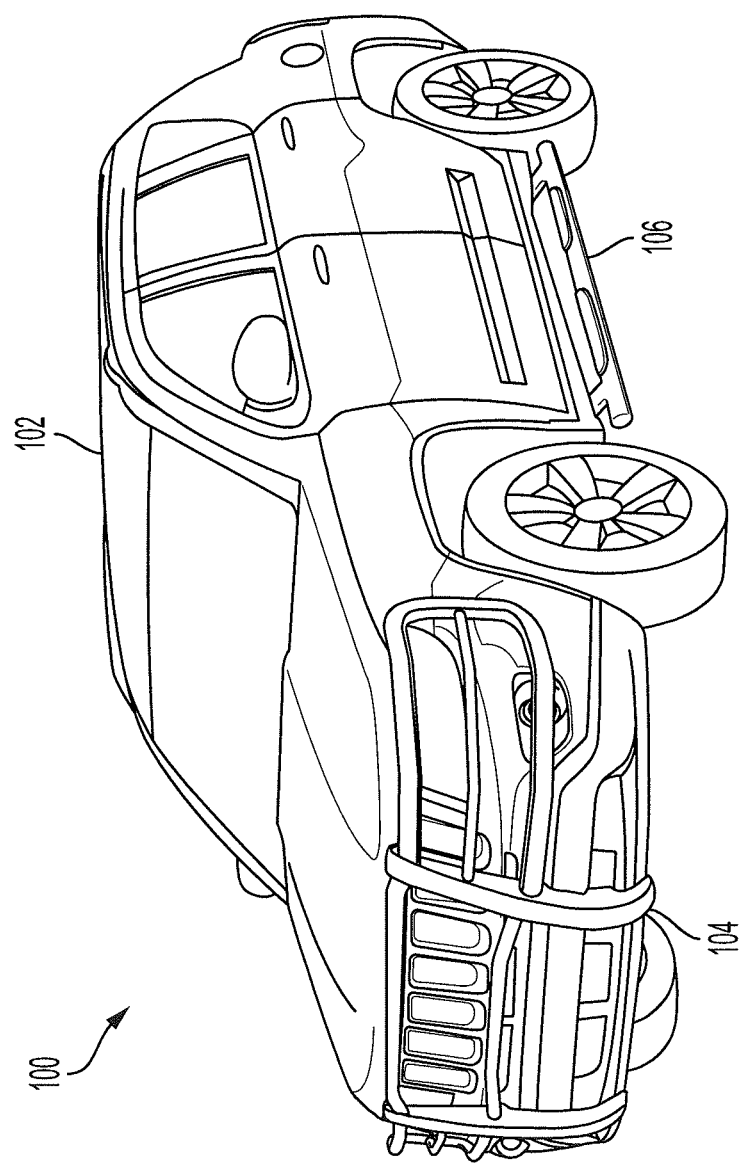
FIG. 1A illustrates a vehicle with accessories attached to the vehicle, according to various embodiments of the invention.

FIG. 1A illustrates a vehicle 102 with accessories mounted to the vehicle 102. The accessories include a grill guard 104 configured to protect a front end of the vehicle 102 and a running board 106 attached to a left side of the vehicle 102 and configured to provide an assistive stepping platform for occupants of the vehicle 102 to step on as they enter the vehicle 102.

The vehicle 102 is a conveyance capable of transporting a person, an object, or a permanently or temporarily affixed apparatus. The vehicle 102 may have an automatic or manual transmission. The vehicle 102 may be a self-propelled wheeled conveyance, such as a car, a sports utility vehicle, a truck, a bus, a van or other motor or battery driven vehicle. For example, the vehicle 102 may be an electric vehicle, a hybrid vehicle, a plug-in hybrid vehicle, a fuel cell vehicle, or any other type of vehicle that includes a motor/generator.

The vehicle 102 may be capable of non-autonomous operation or semi-autonomous operation or autonomous operation. That is, the vehicle 102 may be driven by a human driver or may be capable of self-maneuvering and navigating without human input. A vehicle operating semi-autonomously or autonomously may use one or more sensors and/or a navigation unit to drive autonomously.

Figure 1B:
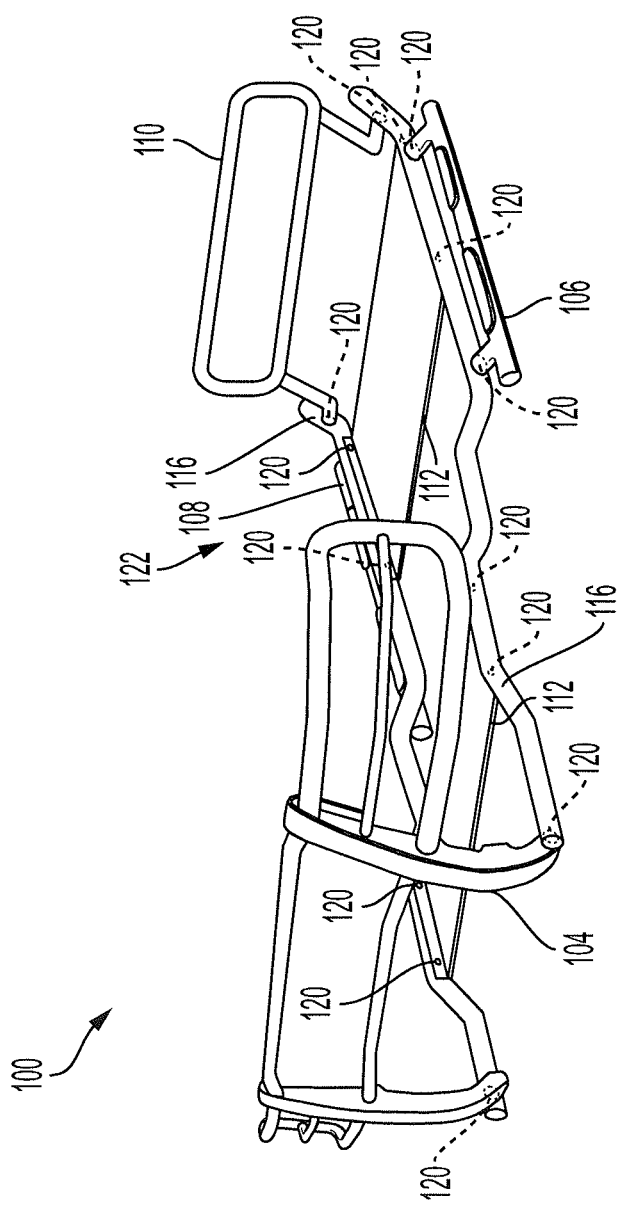
FIG. 1B illustrates a frame of the vehicle of FIG. 1A with accessories attached to the vehicle, according to various embodiments of the invention.

FIG. 1B illustrates the frame 122, including frame rails 116 of the vehicle 102. The frame rails 116 extend along the length of the vehicle 102, and establish support for other components of the vehicle attached to the frame rails 116, including accessories.

A grill guard 104 is attached to the frame rails 116 at attachment points 120 located near the front of the vehicle 102. A left running board 106 is attached to the frame rails 116 at attachment points 120 located on the left of the vehicle 102. A right running board 108 is attached to the frame rails 116 at attachment points 120 located on the right of the vehicle 102. A rear bumper guard 110 is attached to the frame rails 116 at attachment points 120 located near the back of the vehicle 102. Skid plates 112 configured to protect the undercarriage of the vehicle 102 are attached to the frame rails 116 at attachment points 120 located near the middle of the vehicle 102.

While a grill guard 104 is shown as being attached to the front of the vehicle 102 at the attachment points 120 of the frame rails 116, other accessories may be attached instead of the grill guard 104, including, but not limited to, a front bumper, a brush guard, a winch, a tow hook, lights, a snow plow, or an air dam. As described herein, these additional alternative accessories may be easily installed and removed as a result of the features of the systems and methods described herein.

While running boards 106, 108 are shown as being attached to the sides of the vehicle 102 at the attachment points 120 of the frame rails 116, other accessories may be attached instead of the running boards 106, 108, including, but not limited to, nerf bars, rock rails, hoop steps, or side steps. As described herein, these additional alternative accessories may be easily installed and removed as a result of the features of the systems and methods described herein.

While a rear bumper guard 110 is shown as being attached to the rear of the vehicle 102 at the attachment points 120 of the frame rails 116, other accessories may be attached instead of the rear bumper guard 110, including, but not limited to a bed step or a muffler guard. As described herein, these additional alternative accessories may be easily installed and removed as a result of the features of the systems and methods described herein.

While skid plates 112 are shown as being attached to the bottom of the vehicle 102 at the attachment points 120 of the frame rails 116, other accessories may be attached instead of the skid plates 112, including, but not limited to undercarriage lights. As described herein, these additional alternative accessories may be easily installed and removed as a result of the features of the systems and methods described herein.

In some embodiments, the attachment points 120 and the frame rails 116 together comprise the system 100. In yet other embodiments, the attachment points 120, the frame rails 116, and the accessories comprise the system 100. Other components described herein may also be included in the system 100.

Figure 2:
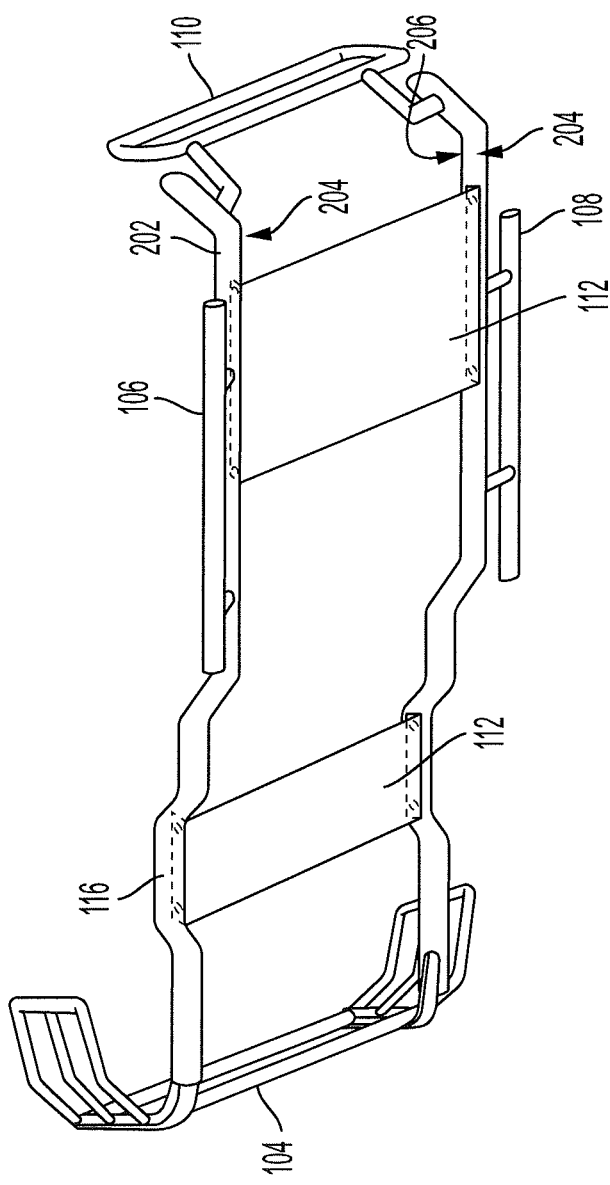
FIG. 2 illustrates a bottom view of the frame of the vehicle with accessories attached to the vehicle, according to various embodiments of the invention.

FIG. 2 illustrates a bottom view of the frame rails 116 and the accessories. The accessories shown are the grill guard 104, the left running board 106, the right running board 108, the rear bumper guard 110, and the skid plates 112.

Each of the frame rails 116 extending lengthwise along the vehicle 102 may have a respective bottom surface 204, a respective outer side surface 202, and a respective inner side surface 206. The outer side surfaces 202 of the two frame rails 116 both face outward away from each other, and the inner side surfaces 206 of the two frame rails 116 both face inward toward each other.

The attachment points may be on the bottom surface 204, the outer side surface 202, or the inner side surface 206, and may vary based on the location of the attachment points. For example, the attachment points at the front and rear of the vehicle may be on the inner side surfaces 206 and/or the outer side surfaces 202 of the frame rails 116. The attachment points on the sides of the vehicle, for receiving the side attachments (e.g., running boards 106, 108) may be located on the outer side surfaces 202 of the frame rails 116. The attachment points for the skid plates 112 may be located on the inner side surfaces 206 of the frame rails 116 or the bottom surfaces 204 of the frame rails 116. In some embodiments, the bottom surface 204 is not sufficiently wide or strong enough to have an accessory attached to it, and all attachment points are located on the outer side surfaces 202 or the inner side surfaces 206 of the frame rails 116.

Figure 3:
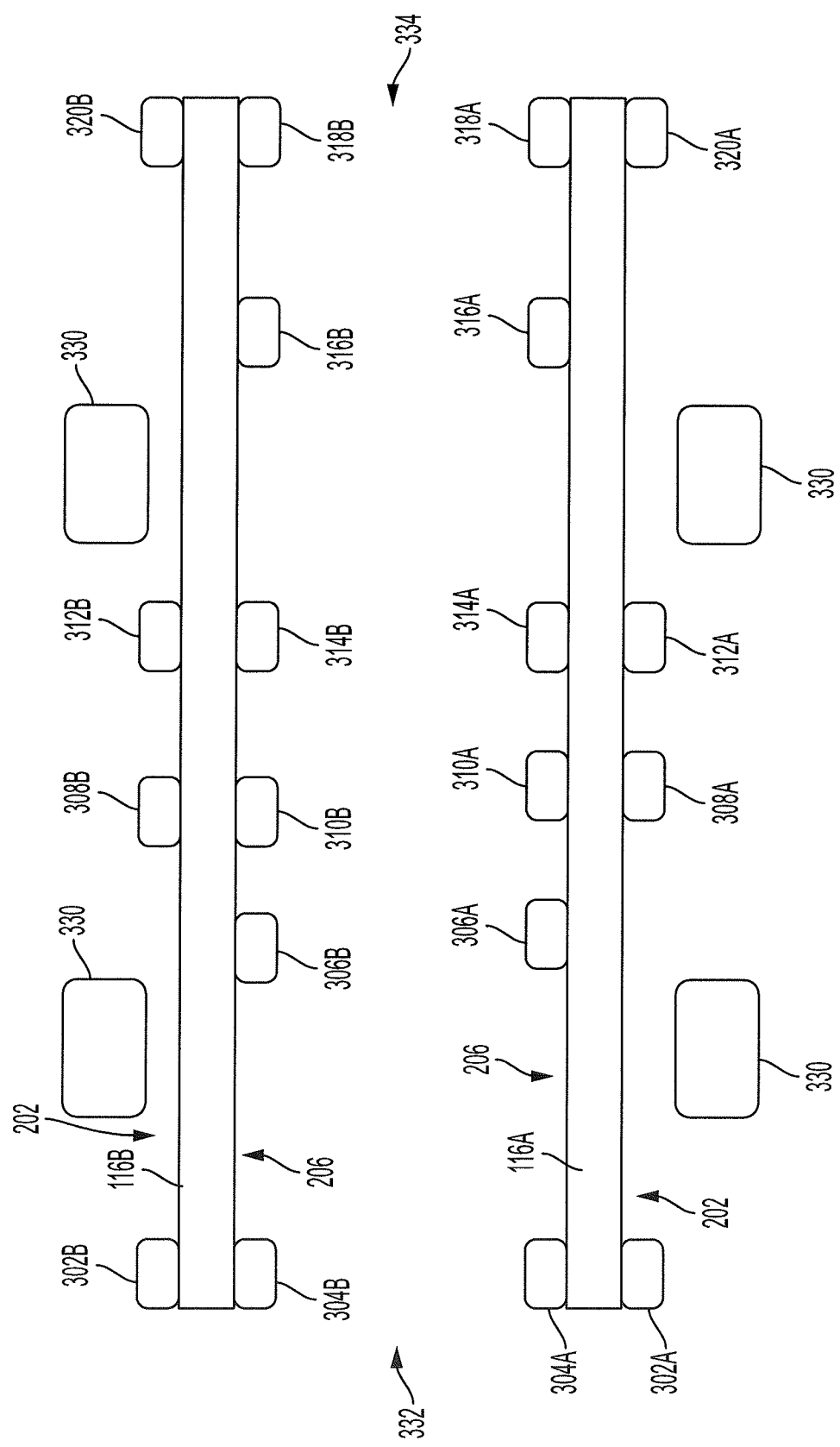
FIG. 3 illustrates a top-down view of the frame rails of a vehicle and potential accessory mounting points, according to various embodiments of the invention.

FIG. 3 illustrates a top-down view of the potential attachment point locations of a vehicle. A left frame rail 116A and a right frame rail 116B is shown, as well as the four tires 330. Components having a letter suffix may be referred to collectively or individually by the number before the letter suffix. For example, frame rail 116 may refer to the left frame rail 116A and the right frame rail 116B collectively or may refer to either the left frame rail 116A or the right frame rail 116B individually.

A first set of attachment points 302 (left first attachment point 302A and right first attachment point 302B) are located on the outer side surfaces 202 of the frame rails 116. The first set of attachment points 302 are located toward the front 332 of the vehicle. A second set of attachment points 304 (left second attachment point 304A and right second attachment point 304B) are located on the inner side surfaces 206 of the frame rails 116. The second set of attachment points 304 are located toward the front 332 of the vehicle.

A third set of attachment points 306 (left third attachment point 306A and right third attachment point 306B) are located on the inner side surfaces 206 of the frame rails 116. The third set of attachment points 306 are located toward the middle of the vehicle.

A fourth set of attachment points 308 (left fourth attachment point 308A and right fourth attachment point 308B) are located on the outer side surfaces 202 of the frame rails 116. The fourth set of attachment points 308 are located toward the middle of the vehicle.

A fifth set of attachment points 310 (left fifth attachment point 310A and right fifth attachment point 310B) are located on the inner side surfaces 206 of the frame rails 116. The fifth set of attachment points 310 are located toward the middle of the vehicle.

A sixth set of attachment points 312 (left sixth attachment point 312A and right sixth attachment point 312B) are located on the outer side surfaces 202 of the frame rails 116. The sixth set of attachment points 312 are located toward the middle of the vehicle.

A seventh set of attachment points 314 (left seventh attachment point 314A and right seventh attachment point 314B) are located on the inner side surfaces 206 of the frame rails 116. The seventh set of attachment points 314 are located toward the middle of the vehicle.

An eighth set of attachment points 316 (left eighth attachment point 316A and right eighth attachment point 316B) are located on the inner side surfaces 206 of the frame rails 116. The eighth set of attachment points 316 are located toward the middle of the vehicle.

A ninth set of attachment points 318 (left ninth attachment point 318A and right ninth attachment point 318B) are located on the inner side surfaces 206 of the frame rails 116. The ninth set of attachment points 318 are located toward the rear 334 of the vehicle.

A tenth set of attachment points 320 (left tenth attachment point 320A and right tenth attachment point 320B) are located on the outer side surfaces 202 of the frame rails 116. The tenth set of attachment points 320 are located toward the rear 334 of the vehicle.

The attachment points shown in FIG. 3 may be used individually or in combinations with other attachment points, depending on the size of the accessory to be mounted. For example, when the accessory is a pair of running boards, the fourth attachment points 308 and the sixth attachment points 312 may be used. However, in another example, single hoops steps may be attached to the right side of the vehicle at attachment points 308B and 312B, and a running board may be attached to the left side of the vehicle at attachment points 308A and 312A. In yet another example, a rear bumper guard may be attached to the ninth set of attachment points 318 and a bed step may be attached to one of the attachment points of the tenth set of attachment points 320.

In another example, a first, smaller skid plate configured to be connected to two total attachment points may be attached to the third set of attachment points 306 and a second, larger skid plate configured to be connected to four total attachment points may be attached to the fifth set of attachment points 310 and the seventh set of attachment points 314. The arrangement of the first skid plate and the second skid plate may be made based on the geometry of the undercarriage of the vehicle. Using the systems and methods described herein, the first skid plate and the second skid plate may be removed from a first vehicle and attached to a second vehicle in a different configuration than on the first vehicle (e.g., first skid plate attached to the seventh set of attachment points 314 and the second skid plate attached to the third set of attachment points 306 and the fifth set of attachment points 310), based on the geometry of the undercarriage of the second vehicle. In this way, accessories may be re-used from a first vehicle to a second vehicle, and new accessories may not have to be purchased for each vehicle.

FIG. 4A illustrates a frame rail 116 and example attachment devices 404 located at respective attachment points (e.g., attachment points 304-320). The attachment devices 404 shown are non-limiting examples of possible attachment devices for securing an accessory to the frame rail 116.

The attachment devices 404 may be made of a rigid and durable material, such as metal. The attachment devices 404 may be made of the same material that the frame rail 116 is made of, and may be attached to the frame rail 116 using any method, such as welding. In some embodiments, the attachment devices 404 are formed integrally with the frame rails 116.

The attachment devices 404 are separated by a distance 406 and are each a height 402 above the ground level 405. The distance 406 corresponds to a distance separating corresponding engagement members of the accessory. The distance 406 may be consistent across all vehicles, so that any accessory may fit any vehicle. In some embodiments, the distance 406 consistency is established for various classes of vehicles. That is, the distance 406 for a large truck may be different from the distance 406 for a compact SUV or a crossover SUV.

FIG. 4B illustrates a perspective view of the frame rail 116 and the attachment devices 404 shown in FIG. 4A. The frame rail 116 runs lengthwise along the vehicle, toward a front direction 452 and a back direction 450.

Each attachment device 404 has a top wall 408, a side wall 410 and a bottom wall 412. The top wall 408 and the bottom wall 412 are parallel with the frame rail 116. The side wall 410 is perpendicular with the frame rail 116 and connects the top wall 408 and the bottom wall 412. The top wall 408, the side wall 410, and the bottom wall 412 define an open cavity 413. The open cavity 413A of the left attachment device 404A may be open toward the front direction 452 and the open cavity 413B of the right attachment device 404B may be open toward the back direction 450. While the top wall 408, the side wall 410, and the bottom wall 412 are shown as being generally rectangular in cross-section (i.e., a right angle is between the top wall 408 and the side wall 410 and between the side wall 410 and the bottom wall 412), the top wall 408, the side wall 410, and the bottom wall 412 may form any shaped cross-section. For example, the top wall 408, the side wall 410, and the bottom wall 412 may form a triangular cross-section, with an approximately sixty-degree angle being located between the top wall 408 and the side wall 410, and between the bottom wall 412 and the side wall 410.

Each attachment device 404 also includes apertures 414 for receiving a connector configured to connect the engagement member of the accessory to the attachment device 404. As shown, the apertures 414 are located on the side portion 410 of the attachment device 404, but may be located on other portions in other embodiments.

FIG. 4C illustrates an accessory 422 being connected to the frame rail 116 via the attachment device 404. The accessory 422 includes multiple engagement members 420 configured to engage with corresponding attachment devices 404 (e.g., a left engagement member 420 configured to engage with a left attachment device 404 and a right engagement member 420 configured to engage with a right attachment device 404).

The engagement members 420 include apertures 412 configured to receive connectors 416. The connectors 416 may be bolts, screws, or any other connecting device. The connectors 416 pass through the apertures 414 of the attachment device 404 and also pass through the apertures 412 of the engagement members 420 to connect the accessory 422 to the frame rail 116.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle accessory system configured for a plurality of vehicle models, the vehicle accessory system comprising:

a plurality of attachment devices compatible with installation on a frame rail of a first vehicle model and a frame rail of a second vehicle model different from the first vehicle model, the installation including installation of the plurality of attachment devices spaced apart by a distance on the frame rail of the first vehicle model and installation of the plurality of attachment devices spaced apart by the distance on the frame rail of the second vehicle model, the plurality of attachment devices configured to:

engage with a plurality of engagement members of a vehicle accessory for installation of the vehicle accessory on the first vehicle model or the second vehicle model, the plurality of engagement members spaced apart by the distance; and secure the plurality of engagement members with the plurality of attachment devices by a plurality of connectors.

2. The system of claim 1, wherein the plurality of attachment devices are compatible with installation on the first vehicle model at a height above ground level and installation on the second vehicle model at the height above the ground level.

3. The system of claim 1, wherein the plurality of attachment devices are configured to secure the plurality of engagement members by removably connecting the plurality of engagement members to the plurality of attachment devices.

4. The system of claim 1, wherein the plurality of attachment devices include a pair of attachment devices compatible with installation proximal to a front of the first vehicle model or the second vehicle model.

5. The system of claim 4, wherein the vehicle accessory is a bumper, a brush guard, a winch, an air dam, or lights configured to connect to the pair of attachment devices compatible with the installation proximal to the front of the first vehicle model or the second vehicle model.

6. The system of claim 1, wherein the plurality of attachment devices include a pair of attachment devices compatible with installation proximal to a middle of the first vehicle model or the second vehicle model.

7. The system of claim 6, wherein the vehicle accessory is a skid plate configured to connect to the pair of attachment devices compatible with the installation proximal to the middle of the first vehicle model or the second vehicle model.

8. The system of claim 1, wherein the plurality of attachment devices include a pair of attachment devices compatible with installation proximal to a rear of the first vehicle model or the second vehicle model.

9. The system of claim 8, wherein the vehicle accessory is at least one of a rear bumper or a muffler guard configured to connect to the pair of attachment devices compatible with the installation proximal to the rear of the first vehicle model or the second vehicle model.

10. The system of claim 1, wherein the plurality of attachment devices include a pair of attachment devices compatible with installation proximal to a left side or a right side of the first vehicle model or the second vehicle model.

11. The system of claim 10, wherein the vehicle accessory is at least one of a running board, a nerf bar, or a rock rail configured to connect to the pair of attachment devices compatible with the installation proximal to the left side or the right side of the first vehicle model or the second vehicle model.

12. The system of claim 1, wherein each attachment device of the plurality of attachment devices includes a top wall, a bottom wall, and a side wall connecting the top wall and the bottom wall, and wherein the top wall, the bottom wall, and the side wall define an open cavity configured to receive the respective engagement member of the plurality of engagement members of the vehicle accessory.

13. A vehicle comprising:

a frame rail; and a plurality of attachment devices installed on the frame rail, the plurality of attachment devices spaced apart by a distance, compatible with installation on another vehicle of a different vehicle model from a vehicle model of the vehicle, and configured to engage with respective engagement members of a plurality of engagement members of a vehicle accessory, the plurality of engagement members spaced apart by the distance and configured to be secured to the plurality of attachment devices via a plurality of connectors.

14. The vehicle of claim 13, wherein the plurality of attachment devices are further configured to disengage with the respective engagement members of the plurality of engagement members of the vehicle accessory, such that the plurality of engagement members can be engaged with another plurality of attachment devices of another vehicle of the different vehicle model, the another plurality of attachment devices being spaced apart by the distance.

15. The vehicle of claim 14, wherein the plurality of attachment devices are compatible with installation on the vehicle model at a height above ground level and installation on the different vehicle model at the height above the ground level.

16. The vehicle of claim 13, wherein the plurality of attachment devices include a pair of attachment devices compatible with installation proximal to a front of the vehicle model or the different vehicle model, and wherein the vehicle accessory is a bumper, a brush guard, a winch, an air dam, or lights configured to connect to the pair of attachment devices compatible with the installation proximal to the front of the vehicle model or the different vehicle model.

17. The vehicle of claim 13, wherein the plurality of attachment devices include a pair of attachment devices compatible with installation proximal to a middle of the vehicle model or the different vehicle model, and wherein the vehicle accessory is a skid plate configured to connect to the pair of attachment devices compatible with the installation proximal the vehicle model or the different vehicle model.

18. The vehicle of claim 13, wherein the plurality of attachment devices include a pair of attachment devices compatible with installation proximal to a rear of the vehicle model or the different vehicle model, and wherein the vehicle accessory is at least one of a rear bumper or a muffler guard configured to connect to the pair of attachment devices compatible with the installation proximal to the rear of the vehicle model or the different vehicle model.

19. The vehicle of claim 13, wherein the plurality of attachment devices include a pair of attachment devices compatible with installation proximal to a left side or a right side of the vehicle model or the different vehicle model, and wherein the vehicle accessory is at least one of a running board, a nerf bar, or a rock rail configured to connect to the pair of attachment devices compatible with the installation proximal to the left side or the right side of the vehicle model or the different vehicle model.

20. The vehicle of claim 13, wherein each attachment device of the plurality of attachment devices includes a top wall, a bottom wall, and a side wall connecting the top wall and the bottom wall, and wherein the top wall, the bottom wall, and the side wall define an open cavity configured to receive the respective engagement member of the plurality of engagement members of the vehicle accessory.

* * * * *